(12) United States Patent
He et al.

(10) Patent No.: US 11,330,293 B2
(45) Date of Patent: *May 10, 2022

(54) SCALING VIDEO PROCESSING COMPLEXITY BASED ON POWER SAVINGS FACTOR

(71) Applicant: NXP USA, INC., Austin, TX (US)

(72) Inventors: Zhongli He, Austin, TX (US); Yong Yan, Austin, TX (US)

(73) Assignee: NXP USA, INC., Austin, TX (US)

( * ) Notice: Subject to any disclaimer, the term of this patent is extended or adjusted under 35 U.S.C. 154(b) by 586 days.

This patent is subject to a terminal disclaimer.

(21) Appl. No.: 15/842,061

(22) Filed: Dec. 14, 2017

(65) Prior Publication Data

US 2018/0115784 A1    Apr. 26, 2018

Related U.S. Application Data

(63) Continuation of application No. 11/539,522, filed on Oct. 6, 2006, now Pat. No. 9,883,202.

(51) Int. Cl.
| | | |
|---|---|---|
| *H04N 7/12* | (2006.01) | |
| *H04N 19/577* | (2014.01) | |
| *H04N 19/176* | (2014.01) | |
| *H04N 19/119* | (2014.01) | |
| *H04N 19/61* | (2014.01) | |
| *H04N 19/11* | (2014.01) | |
| *H04N 19/117* | (2014.01) | |
| *H04N 19/132* | (2014.01) | |
| *H04N 19/154* | (2014.01) | |
| *H04N 19/156* | (2014.01) | |
| *H04N 19/523* | (2014.01) | |

(52) U.S. Cl.
CPC .......... *H04N 19/577* (2014.11); *H04N 19/11* (2014.11); *H04N 19/117* (2014.11); *H04N 19/119* (2014.11); *H04N 19/132* (2014.11); *H04N 19/154* (2014.11); *H04N 19/156* (2014.11); *H04N 19/176* (2014.11); *H04N 19/523* (2014.11); *H04N 19/61* (2014.11)

(58) Field of Classification Search
CPC .................................................. H04N 19/156
See application file for complete search history.

*Primary Examiner* — Y Lee

(57) ABSTRACT

A method of scaling complexity of a video processing system including determining a power saving factor based on an operating parameter and adjusting processing of video information based on the power saving factor to reduce computation complexity. The operating parameter may include available power and/or available processing capacity. A method of complexity scalability for a video processing system using prioritized layered coding including determining a power saving factor based on one or more metrics, such as power capacity and/or available processing capacity, and reducing processing complexity of multiple prioritized coding functions in a predetermined order of priority based on the level of the power saving factor. A video processing system including a power management circuit which determines the power saving factor and a video encoder system which correspondingly adjusts computation complexity.

24 Claims, 4 Drawing Sheets

SCALING VIDEO PROCESSING COMPLEXITY BASED ON POWER SAVINGS FACTOR

This application is a continuation application of a U.S. patent application entitled "SCALING VIDEO PROCESSING COMPLEXITY BASED ON POWER SAVINGS FACTOR", having a Ser. No. of 11/539,522, having a filing date of Oct. 6, 2006, having common inventors, and having a common assignee, all of which is incorporated by reference in its entirety.

BACKGROUND OF THE INVENTION

Field of the Invention

The present invention relates in general to scalable video processing, and more specifically to a system and method for scaling complexity of video processing using prioritized layered coding and based on a power savings factor.

Description of the Related Art

The Advanced Video Coding (AVC) standard, Part 10 of MPEG4 (Motion Picture Experts Group), otherwise known as H.264, includes advanced compression techniques that were developed to enable transmission of video signals at a lower bit rate or to enable improved video quality at a given transmission rate. The newer H.264 standard outperforms video compression techniques of prior standards in order to support higher quality streaming video at lower bit rates and to enable internet-based video and wireless applications and the like. The standard defines the syntax of the encoded video bit stream along with a method of decoding the bit stream. Scalable Video Coding (SVC) is an extension of the 11264 which addresses coding schemes for reliably delivery of video to diverse clients over heterogeneous networks using available system resources, particularly in scenarios where the downstream client capabilities, system resources, and network conditions are not known in advance, or dynamically changing from time to time.

SVC achieves scalability by defining a base layer and supporting one or more enhanced layers in which each enhanced layer is scaled based on the base layer information. Whereas H.264 has relatively limited scalability, SVC provides multiple levels of scalability including temporal scalability, spatial scalability, complexity scalability and quality scalability. The base layer should be the simplest form in quality, spatial resolution and temporal resolution. Temporal scalability generally refers to the number of frames per second (fps) of the video stream, such as 7.5 fps, 15 fps, 30 fps, etc. Spatial scalability refers to the resolution of each frame, such as common interface format (CIF) with 352 by 288 pixels per frame, or quarter CIF (QCIF) with 176 by 144 pixels per frame, although other spatial resolutions are contemplated, such as 4CIF, QVGA, VGA, SVGA, D1, HDTV, etc, Complexity scalability generally refers to the various computation capabilities and processing power of the devices processing the video information. Quality scalability is generally measured with a peak signal-to-noise (PSNR) metric defining the relative quality of a reconstructed image compared with an original image. The present disclosure primarily concerns complexity scalability.

Most practical video codecs, including video encoders and decoders, have a particular computation capacity and a limited power capacity. The computation capacity may be generally defined by the capacity or speed of the video processing circuitry (e.g., central processing unit (CPU) or the like) and other supporting circuitry. Power capacity is limited in certain applications, such as mobile devices employing a battery. Mobile devices, for example, have very limited processing power and battery life. Complexity scalability is an attractive technique for mobile devices in order to maximize coding efficiency while minimizing computation cost. Yet most existing codecs have a fixed or very limited computation complexity which cannot be dynamically adjusted by the user and is subject to the variable workload of the operating system among other factors. The workload of the codec is varied based on the complexity of the information being processed, such as the level of motion in an input video stream. A fixed or limited computation complexity is disadvantageous in a dynamic environment, including variable processing power availability, variable power capacity, variable channel capacity, and variable workload. Existing solutions resolve the computation complexity by attempting to reduce complexity in individual functions, such as by reducing picture size (spatial resolution) or reducing frame rate (temporal resolution), which functions are normally not changeable during real-time coding operations. These existing solutions normally introduce a relatively large visual quality degradation.

It is desired to provide real time complexity scalability to provide an acceptable level of visual quality under a variety of variable operating conditions, such as variations in available processing power, power capacity, channel capacity, workload conditions, etc.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. The present invention, for example, applies generally to any "video information" including MPEG (e.g., MPEG-1, MPEG-2, and MPEG-4), ITU-T (e.g., H261, H263, and H264), etc. The present invention is not intended to be limited to the particular embodiments shown and described herein, but is to be accorded the widest scope consistent with the principles and novel features herein disclosed.

Figure 1:
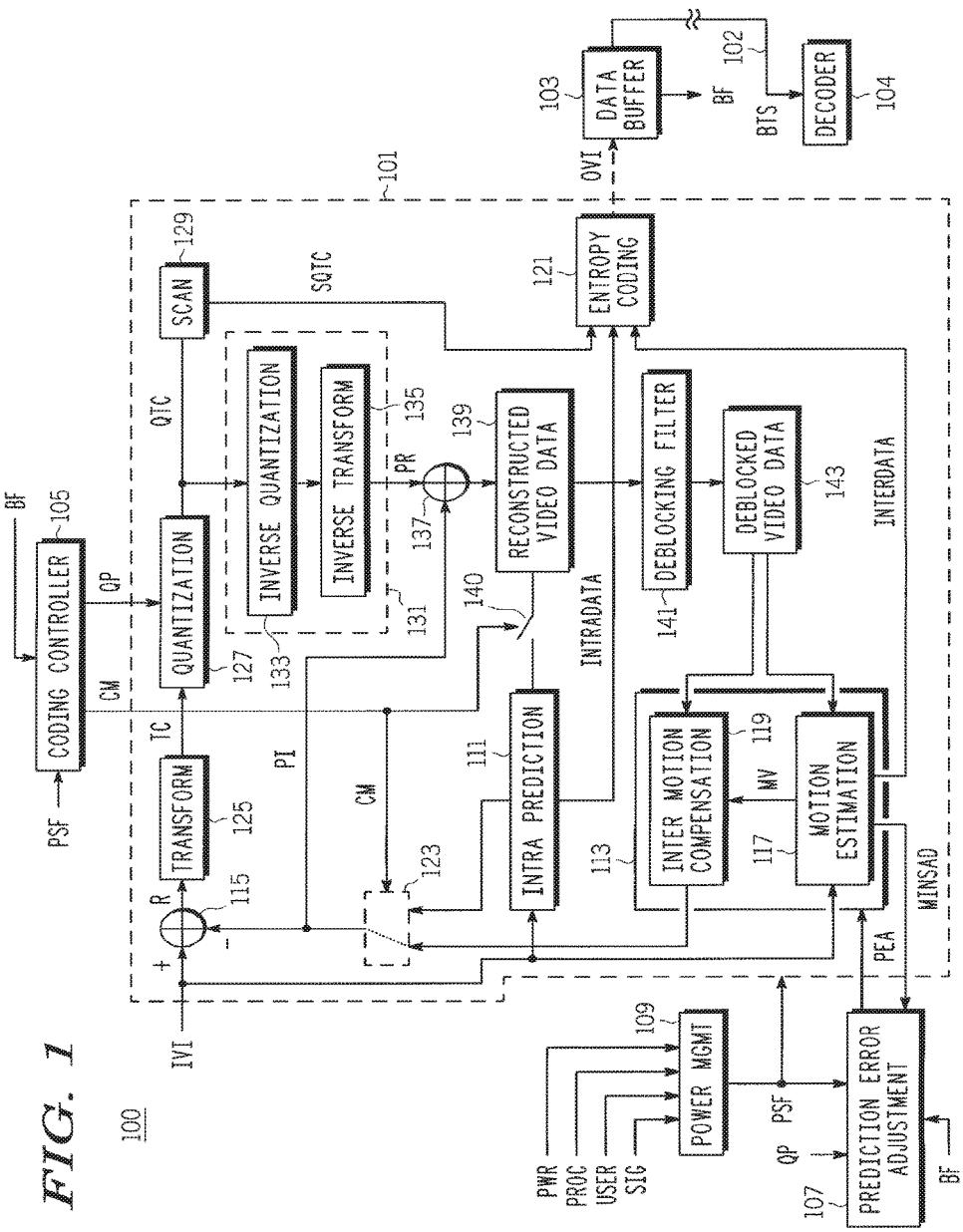
FIG. 1 is a block diagram of a video processing system for converting uncompressed input video information into a compressed output bitstream.

FIG. 1 is a block diagram of a video processing system 100 for converting uncompressed input video information (IVI) into a compressed output bitstream BTS. The bitstream BTS is transmitted via a channel 102 to a decoder 104, which performs a reverse process for generating a decoded version of the input video information for storage or display. The video processing system 100 includes a video encoder 101, an output data buffer 103, a coding controller 105, a prediction error adjustment circuit 107, and a power management circuit 109. The encoder 101 receives the input video information IVI and provides a compressed output video information (OVI) to an input of the data buffer 103, which provides the bitstream BTS for transmission on the channel. The data buffer 103 generates a buffer fullness (BF) signal which is provided to the coding controller 105 and the prediction error adjustment circuit 107. The coding controller 105 includes an intra/inter mode decision engine (not shown) and a rate control engine (not shown) and generates a coding mode (CM) signal and a quantization parameter (QP), where the CM signal and the QP are both provided to the video encoder 101. The QP is also provided to the prediction error adjustment circuit 107. The power management circuit 109 monitors a variety of factors of the video processing system 100, including power level or available power (e.g., battery level) via a power metric PWR, available processing resources via a processing metric PROC, a signal strength metric SIG indicating the signal strength of the bitstream BTS transmitted in the channel 102, and one or more user settings collectively indicated by a user metric USER, and generates a power saving factor (PSF) signal, which is provided to the video encoder 101, the coding controller 105 and the prediction error adjustment circuit 107. The USER metric incorporates manual settings and adjustments made by the user. The prediction error adjustment circuit 107 monitors the values of the PSF, QP and BF signals and generates a prediction error adjustment (PEA) signal to the video encoder 101. The PSF signal is provided to various portions or sub-circuits within the video encoder 101 to perform complexity scalability as further described below.

The data buffer 103 generally provides a predetermined bitrate video stream via the channel 102 to a receiving device, such as the video decoder 104. Generally, data can be transmitted at a predetermined bitrate, which is often a fixed rate. The size of the compressed video information from the video encoder 101 varies depending upon the amount of compression applied to a particular set of video image information. Video information, encoded with an increased level of compression is transmitted at an improved bitrate.

The coding controller 105 receives the BF signal and operates to ensure that the data buffer 103 does not overflow or underflow. The BF signal provides an indication of the remaining data capacity of data buffer 103. If the data buffer 103 becomes overloaded, one or more frames of video information may be skipped. In an attempt to avoid skipping frames, the rate controller portion of the coding controller 105 adjusts the QP used by the video encoder 101 and the prediction error adjustment circuit 107. During the compression process, the video encoder 101 transforms a prediction error into a frequency domain using a transform in H.264/MPEG4 AVC, such as an integer transform that approximates the transform function. The discrete cosine transform (DCT) is one method of performing the transform function, although other transform methods are possible and contemplated. The video encoder 101 quantizes the transformed coefficients using quantization step sizes, which are directly determined from the QP. A small value of QP enables the prediction error to be more accurately represented, thereby improving picture quality, at the cost of reduced compression and corresponding bitrate. Likewise, a large value of QP provides increased compression and reduced bitrate at the cost of reduced accuracy picture quality. The QP generally represents a degree of complexity of the current video frame. It also follows that the rate controller can control the fullness of the data buffer 103 using the QP to control the bitrate of the compressed video data. The coding controller 105 also includes components that determine the rate control of the video encoder 101 and selects between an "intra" coding mode (intracoding) and an "inter" coding (intracoding) mode and generates the CM signal accordingly. The PSF signal provided by the power management circuit 109 modifies the normal coding mode decision for complexity scalability as further described below.

The prediction error adjustment circuit 107 adjusts utilization of prediction error reduction computation resources in the video encoder 101 by, for example, monitoring the amount of motion in a current set of image data, monitoring the prediction error between the current set of image data, and monitoring the fullness of data buffer 103. In at least one other embodiment, a user can manually control the operational status of the prediction error adjustment circuit 107 via the PSF signal. The prediction error adjustment circuit 107 provides the PEA signal to the video encoder 101 to adjust prediction error reduction computation resource utilization of the video encoder 101. In at least one embodiment, the prediction error adjustment circuit 107 controls whether or not the video encoder 101 performs sub-pixel interpolation on a set of video image information, such as a macroblock or frame of video data. In addition, even if sub-pixel interpolation is performed, the PEA signal dictates the level of sub-pixel interpolation, such as whether or not to perform ½ and ¼ pixel interpolation. Thus, the prediction error adjustment circuit 107 can indirectly control the amount of compression for a set of video image data, the bitrate of the compressed video data signal, the resolution of the compressed video data signal, and the fullness of data buffer 103.

Within the video encoder 101, the IVI signal is provided to an intra prediction circuit 111, an intercoding circuit 113, and a mixer 115 (e.g., subtractor). The prediction error adjustment circuit 107 provides the PEA signal to the intercoding circuit 113 to dynamically adjust video processing prediction error reduction computations in accordance with the amount of motion represented in a set of image data and/or available memory resources to store compressed video data. The intercoding circuit 113 includes a motion estimation circuit 117 and an inter motion compensation circuit 119. The motion estimation circuit 117 generates a motion vector (MV), which is provided to the inter motion compensation circuit 119. The motion estimation circuit 117 also generates intercoding mode data, shown as a signal INTERDATA, to an entropy coding circuit 121 for encoding. The INTERDATA signal includes the MV and other information, such as, for example, the macroblock type, a coded block pattern, a reference frame index, etc., all of which are encoded by the entropy coding circuit 121. The motion estimation circuit 117 performs a motion search and determines a minimum sum of absolute difference (SAD) value, or minSAD value, in accordance with equation (5) described further below. The minSAD is provided to the prediction error adjustment circuit 107. The mixer 115 determines the difference between the signal and a prediction information (PI) signal, which is selected by a switching device 123 from either intra-prediction data at the output of the intra prediction circuit 111 or inter-motion data at an output of the inter motion compensation circuit 119. The switching device 123 is controlled by the coding controller 105 via the CM signal. The intra prediction circuit 111 generates intra prediction information incorporated within an INTRADATA signal provided to the entropy coding circuit 121 for entropy encoding. The INTRADATA signal includes intra prediction information, such as, for example, intra prediction mode indication, the macroblock type, a coded block pattern, etc.

The mixer 115 determines a difference between the IVI signal and the PI signal and provides a residual information signal R at its output to a transform circuit 125. The forward transform circuit 125 uses a selected transform function, such as the DCT algorithm or the like, and provides transform coefficients TC to a quantization circuit 127. The TC are scaled to integers and quantized into quantized transform coefficient (QTC) signal by quantization circuit 127, where the quantization step size is controlled by the QP provided by the coding controller 105. The quantized transform coefficients incorporated within the QTC signal are scanned by a scan circuit 129, which outputs a scanned QTC (SQTC) signal which is entropy coded by the entropy coding circuit 121. The entropy coding circuit 121 employs any type of entropy encoding such as Universal Variable Length Codes ("UVLC"), Context Adaptive Variable Length Codes ("CAVLC"), Context-based Adaptive Binary Arithmetic Coding ("CABAC"), or combinations thereof, or any other type of entropy encoding as known to those skilled in the art. The entropy coded information is provided to the data buffer 103 as the OVI signal for transmission. When the intra prediction circuit 111 is associated with the current entropy encoded transform coefficients, the intraprediction mode, macroblock type, and coded block pattern are included in the compressed video data bitstream. When the intercoding circuit 113 is associated with the current entropy encoded transform coefficients, the determined motion vector MV, macroblock type, coded block pattern, and reference frame index are included in the compressed video data.

The video encoder 101 also incorporates an internal decoder 131 to determine predictions for the next set of video information. The quantized transform coefficients within the QTC signal are inverse quantized by inverse quantization circuit 133 and inverse transform coded by inverse transform coding circuit 135 to generate a decoded prediction residual PR signal. The PR signal is added to the prediction information PI signal by a mixer 137 (e.g., adder), which provides reconstructed video data 139. The reconstructed video data 139 is provided to the intra prediction circuit 111 if the video encoder 101 is in intra coding mode, as determined by a switch 140 controlled by the CM signal. The reconstructed video data 139 is also provided to a deblocking filter 141, which deblocks the reconstructed video data 139 to generate deblocked video data 143. It is noted, however, that the deblocking filter 141 may be disabled under certain conditions, such as a relatively high value of the PSF signal, so that the reconstructed video data 139 is passed unfiltered as the deblocked video data 143. In either case, the video data 143 (filtered or unfiltered) is provided to the inter motion compensation circuit 119 and the motion estimation circuit 117 of the intercoding circuit 113 for use in motion compensating the next image data.

The compressed bitstream BTS is ultimately provided to the decoder 104. The decoder 104 uses the information in the compressed bitstream BTS in the attempt to reconstruct the uncompressed input video information IFI. In one embodiment, the encoder 101 and the decoder 101 code and decode video data in accordance with the H.264/MPEG-4 AVC video coding standard, although other standards are contemplated. Since the decoder 104 performs a reverse process of video encoder 101, complexity scalability reductions by the video encoder 101, as further described below, are shared by video decoder 104.

Figure 2:
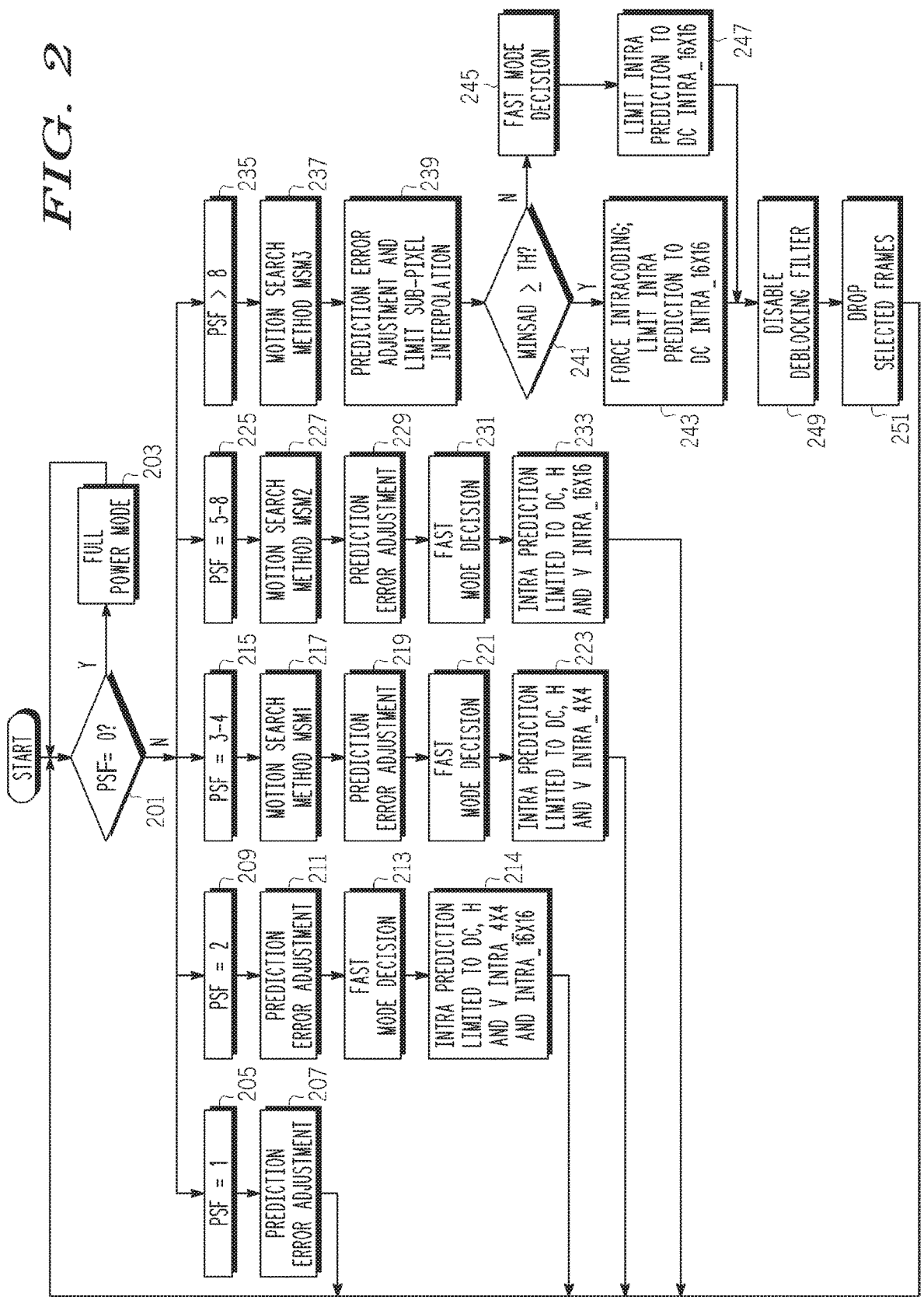
FIG. 2 is a flowchart diagram illustrating general operation of the video processing system of FIG. 1 based on the level of the PSF signal.

FIG. 2 is a flowchart diagram illustrating general operation of the video processing system 100 based on the level of the PSF signal. In the illustrated embodiment, the PSF signal ranges from zero (0) to sixteen (16), in which PSF=0 indicates maximum available power and processing resources such that essentially most or all coding methods and tools are used as needed to achieve maximum coding efficiency and highest quality video signal. The coding methods and tools are prioritized and layered, so that as PSF is increased, lower priority methods or tools are modified, reduced or otherwise turned off or bypassed. Each of the coding techniques is prioritized beforehand based on its coding significance (CS) factor determined according to the following equation (1):

$$CS = \alpha \left[ \frac{\text{Coding\_Efficiency}}{\text{Computation\_Cost}} \right] \quad (1)$$

in which "α" is a predetermined constant, Coding_Efficiency is predetermined according to the level of efficiency of the particular function, and Computation_Cost is predetermined according to the cost of computation in terms of processing cycles consumed to perform the function. A coding function with a relatively high coding efficiency and low computation cost has a relatively large CS value, and thus a higher priority. The lower the CS value, the lower the priority of the coding function. As PSF is increased, the lower priority coding functions are modified or otherwise turned off to save power and computation capacity in order to leave sufficient capacity the higher priority functions. The coding techniques that are prioritized include those involved with motion estimation, motion compensation, intra prediction, mode decision and deblock filtering as further described below.

At a first block 201, it is queried whether PSF is zero. If so, operation is in full power mode as indicated at block 203 in which all prioritized tools remain fully active. Operation remains fully active while PST=0. When PST increases above zero, operation follows any one of several paths depending upon the value of PST. When PST=1 as indicated at block 205, then the prediction error adjustment circuit 107 conducts prediction error adjustment as indicated at block 207. As further described below, during prediction error adjustment, the prediction error adjustment circuit 107 adjusts the PEA signal to control the level of sub-pixel (half and quarter) interpolation based on the values of PSF, QP and the BF signal to reduce computation complexity. Although PSF is no longer zero, since it is only one and thus relatively low, more information is selected for sub-pixel interpolation as compared with higher PSF values and further depending upon the values of QP and BF. Operation loops back to block 201 and continues to loop back to blocks 205 and 207 as long as PSF=1. In this manner, the value of PSF is constantly monitored since it may change in a dynamic coding environment.

When PSF=2 as indicated at block 209, operation proceeds to block 211 in which the prediction error adjustment circuit 107 conducts prediction error adjustment and adjusts the PEA signal in the same manner as described above for block 207. In this case, however, a decreased amount of information is likely to be selected for sub-pixel interpolation on the average at block 211 as compared to block 207 since PSF is increased. And operation further proceeds to block 213 in which the coding controller 105 conducts fast mode decision between intracoding and intercoding as further described below. Operation then proceeds to block 214 in which intra prediction is only performed in the DC, horizontal and vertical intra_4×4 and intra_16×16 modes if the intracoding mode is selected based on the fast mode decision. In this case, the intra prediction circuit 111 adjusts it operation based on PSF. As described in the ITU-T, H.264 specification, up to at least 9 different intra prediction modes are defined during normal intracoding mode. At block 214, the number of intra prediction modes is reduced to only six intra prediction modes to reduce computation complexity. In the illustrated embodiment, DC, horizontal and vertical intra_4×4 and intra_16×16 are the six intra prediction modes that are selected, although any reduced number of the total number of intra prediction modes may be selected instead. If the coding controller 105 selects intracoding mode as a result of the fast mode decision at block 213, then is no intra prediction since intracoding mode is not selected and block 214 is ignored. Operation loops back to block 201 and continues to loop back to blocks 209, 211, 213 and 214 while PSF=2 for both prediction error adjustment and fast mode decision.

When PSF is 3 or 4 (or in the range PSF=3-4) as indicated at block 215, operation proceeds instead to block 217 in which the motion search method (MSM) is modified to a first motion search method MSM1, or MSM=MSM1. In this case, the level of the PSF signal is used to modify the operation of the intercoding circuit 113, and more particularly, the motion estimation circuit 117 which performs the motion search. There are several methods for modifying the motion search method to reduce the computation complexity. In one embodiment as described herein, the search range is reduced, such as by one-half the full search range, which effectively reduces the motion search window by one-fourth. Reducing the motion search window reduces the maximum number of search candidates so that complexity is reduced. In a specific configuration, for example, the full search range is 32×32 within a reference frame for intercoding mode, and one-half the search range reduces the motion search range to 16×16, which is one-fourth the size of the full search range window. Other search reduction methods are contemplated in addition and/or in the alternative, such as modifying the search method or algorithm for a given or selected search window size. Fast search methods are known in which a pre-defined pattern or algorithm is employed to reduce the number of search candidates within a given window size. Fast search methods include, for example, various three-step algorithms including a fast three-step algorithm, various hierarchical search methods, etc. in this manner, the search window is reduced and/or the search method is modified to reduce the scope or complexity of motion search.

Operation proceeds from block 217 to block 219 to perform prediction error adjustment in the same manner as described above with respect to blocks 207 and 211 with an increased value of PSF. Operation then proceeds to block 221 to perform fast mode decision as described below. Operation then proceeds to block 223 in which intra prediction, as performed by the intra prediction circuit 111, is only performed in the DC, horizontal and vertical intra_4×4 modes if the intracoding mode is selected based on the fast mode decision. At block 223, the number of intra prediction modes is reduced to only three intra_4×4 prediction modes to reduce computation complexity. In the illustrated embodiment, DC, horizontal and vertical intra_4×4 are the three intra prediction modes that are selected, although any reduced number of the total number of intra prediction modes many be selected instead. If the coding controller 105 selects intercoding mode as a result of the fast mode decision at block 221, then is no intra prediction since intracoding mode is not selected and block 223 is ignored. Operation then loops back to block 201 and continues to loop back to blocks 215-223 while PSF=3-4.

When PSF is in the range of 5 to 8 (or PSF=5-8) as indicated at block 225, operation proceeds instead to block 227 in which the MSM is modified to a second motion search method MSM2, or MSM=MSM2. In one embodiment, the full search range length is reduced, such as by one-fourth the full search range length, which effectively reduces the motion search window by one-sixteenth. One-sixteenth the search range window limits the motion search range to 8×8, which is one-sixteenth the size of the full search range window of 32×32. Again, other search reduction methods are contemplated, such as modifying the search method again either alone or together with the reduction of the search range as previously described. Operation further proceeds to block 229 for prediction error adjustment in the same manner as described above with an even higher value of PSF. Operation then proceeds to block 231 to perform fast mode decision in the same manner described above. Operation then proceeds to block 233 in which intra prediction is only performed in the DC, horizontal and vertical intra_16×16 modes as described in the ITU-T, H.264 specification if the intracoding mode is selected based on the fast mode decision. At block 233, the number of intra prediction modes is reduced to only three intra_16×16 prediction modes to further reduce computation complexity. If the coding controller 105 selects intercoding mode as a result of the fast mode decision at block 231, then is no intra prediction since intracoding mode is not selected and block 233 is ignored. Operation then loops back to block 201 and continues to loop back to blocks 225-233 while PSF=5-8.

Figure 3:
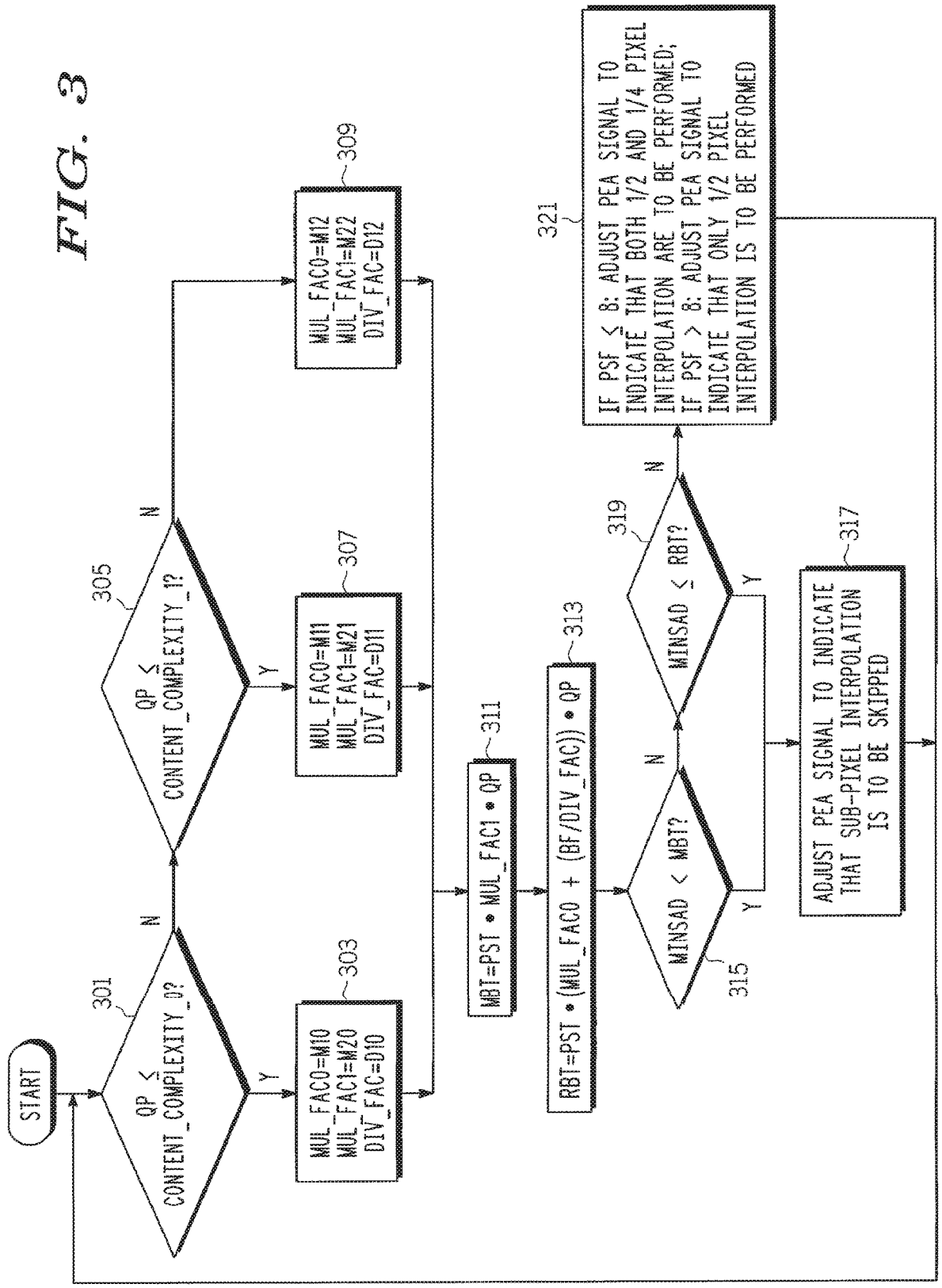
FIG. 3 is a flowchart diagram illustrating operation of the prediction error adjustment circuit of FIG. 1 while performing prediction error adjustment, such as described for prediction error adjustment blocks of FIG. 2 when PSF>0 according to an exemplary embodiment.

When PSF is greater than 8 (or PSF>8) as indicated at block 235, operation proceeds instead to block 237 in which the MSM is modified to a third motion search method MSM3, or MSM=MSM3. In one embodiment, the full search range is reduced, such as by one-eighth the full search range, which effectively reduces the motion search window range by one-sixty-fourth, One-sixty-fourth the search range reduces the motion search to the range of a small 4×4 area for a significantly reduced number of search candidates. Again, other search reduction methods are contemplated in addition or in the alternative as previously described. Operation further proceeds to block 239 to perform prediction error adjustment similar to that previously described. In this case, however, if sub-pixel interpolation is chosen, since PSF>8 sub-pixel interpolation is only performed at the ½ pixel level and ¼ pixel interpolation is skipped as further described below at block 321 (FIG. 3). It is understood that biz pixel interpolation takes significantly more processing cycles as compared to ½ pixel interpolation, yet additional savings are achieved by eliminating ¼ pixel interpolation.

At next block 241, it is queried whether the minSAD value is greater than or equal to a predetermined threshold value TH. If so, in mode is forced as shown at block 243 and intercoding mode is rejected. Furthermore, for the forced intracoding mode at block 243, intra prediction is limited to intra_16×16 mode with only DC prediction. The threshold value TH is chosen at a sufficiently high level such that if the minSAD reaches this relatively high value, intercoding mode is likely to be less efficient than the intracoding mode. In this manner, when PSF>8 and minSAD≥TH, the coding controller 105 overrides the normal coding mode decision to force intracoding mode. If, however, the minSAD value is less than TH, then operation proceeds to block 245 to perform the fast mode decision in the same manner described above. From block 245, operation proceeds to block 247 in which intra prediction, if the intracoding mode is selected, is limited to intra_16×16 with only DC prediction. If the coding controller 105 selects intercoding mode at block 245, then block 247 is ignored since intra prediction is not relevant.

From either block 243 or 247, operation to block 249 in which the deblocking filter 141 is completely disabled. In this case, when PSF>8 the deblocking filter 141 is disabled. It is noted that disabling a deblocking filter generally achieves some power reduction in the video encoder 101 (e.g., approximately 5%), whereas disabling the deblocking filter achieves a significant savings (e.g., approximately 30%) in the decoder 104. If the deblocking filter 141 is disabled in the video encoder 101 when encoding certain information, then the corresponding deblocking filter (not shown) in the decoder is also disabled for the same information to maintain consistency of the information being decoded. Operation then proceeds to block 251 in which the coding controller 105 determines whether to drop selected frames, and if so, determines which frames or percentage of frames are dropped. Certain percentages of frames are dropped depending upon the PSF level and reduction of complexity achieved versus visual quality. Operation then loops back to block 201 and continues to loop back to blocks 235 to 251 while PSF>8.

The flowchart diagram of FIG. 2 illustrates that prediction error adjustment is performed whenever PSF>0, and when PSF>8, then ¼ pixel interpolation is further skipped. Whenever. PSF>1, then fast mode decision is performed unless the intracoding mode is forced when PSF>8 and minSAD≥TH. When PSF>1, intra prediction is successively reduced. As PSF increases above 2, the motion search method is successively modified, such as successively reducing the motion search window and/or employing one or more fast motion algorithms. When PSF>8, the minSAD value is compared with the predetermined threshold TH to determine whether to force the intracoding mode, the deblocking filter 141 is fully disabled in the video encoder 101 and thus in the decoder for the same information, and frames are selectively dropped as necessary.

FIG. 3 is a flowchart diagram illustrating operation of the prediction error adjustment circuit 107 while performing prediction error adjustment, such as described for blocks 207, 211, 219, 229 and 239 when PSF>0 according to an exemplary embodiment. In at least one embodiment, the prediction error adjustment circuit 107 determines prediction error reduction computation adjustment based on the size of a prediction error between a set of current image data and a reference set of image data relative to an amount of motion in the current set of image data. Additionally, in at least one embodiment, the prediction error adjustment circuit 107 determines the prediction error reduction computation adjustment signal based upon the fullness level of the data buffer 103 relative to the amount of motion in the current set of image data. The motion estimation circuit 117 performs pixel interpolation, and the prediction error adjustment circuit 107 asserts the PEA signal to control whether sub-pixel interpolation is performed and if so, to what level.

The prediction error adjustment circuit 107 evaluates the complexity of a set of video image information, such as a video frame, based on the value of QP for the set of video image data. In at least one embodiment, the complexity of the set of video image data is determined to be in one of two groups based on a comparison between QP and two content complexity values, respectively labeled Content_Complexity_0 and Content_Complexity_1. The number of and values of the complexity values is a matter of design choice based on the overall encoder performance. The content complexity values are intended to represent a measure of complexity of the image data. In at least one embodiment, the measure of complexity indicates an amount of motion between a current set of image data and a reference set of image data. Content_Complexity_0 and Content_Complexity_1 are set at boundaries of small/medium motion and medium/large motion, respectively, in which Content_Complexity_1>Content_Complexity_0. Content_Complexity_0 and Content_Complexity_1 may be determined in any manner, such as set manually, set to predetermined fixed values, or dynamically adjusted based on actual measurements of video motion.

At first block 301 it is queried whether QP is less than or equal to Content_Complexity_0. If so, operation proceeds to block 303 in which several variables mul_fac0, mul_fac1, and div_fac are set to values M10, M20, and D10, respectively. As explained in more detail below, the values of the variables mul_fac0, mul_fac1, and div_fac are later used to determine a motion based threshold (MBT) and a resource based threshold (RBT). If QP is greater than Content_Complexity_0, operation proceeds instead to block 305 in which it is queried whether QP is less than or equal to Content_Complexity_1. If so, operation proceeds to block 307 in which the variables mul_fac0, mul_fac1, and $div_{13}$ fac are instead set to values M11, M21, and D11, respectively. Otherwise, if QP is greater than Content_Complexity_1, operation proceeds to block 309 in which the variables mul_fac0, mul_fac1, and div_fac are set to values M12, M22, and D12, respectively. The variable values mul_fac0, mul_fac1, and div_fac determined in blocks 303, 307, or 309 make the values of MBT and RBT progressively higher given a certain buffer fullness level when the complexity of a picture increases.

After any of blocks 303, 307, or 309, operation proceeds to block 311 in which the motion based threshold MBT is calculated based on the values of mul_fac1, QP, and PSF in accordance with the following equation (3):

$$MBT = PSF \cdot mul\_fac1 \cdot QP \quad (3)$$

in which the dot "•" denotes multiplication. The MBT represents a motion based factor used in determining whether prediction error computation resources of the video encoder 101 can be adjusted to reduce or increase the amount of prediction error reduction computations, such as pixel interpolation calculations. After MBT is calculated, operation proceeds to block 313 in which the resource based threshold RBT is determined based on the values of mul_fac0, QP, BF, div_fac, and the PSF in accordance with the following equation (4):

$$RBT = PSF\left(mul\_fac0 + \left(\frac{BF}{div\_fac}\right)QP\right) \quad (4)$$

The RBT represents a resource availability based factor used in determining whether prediction error computation resources of the video encoder 101 can be adjusted to reduce or increase the amount of prediction error reduction computations, such as pixel interpolation calculations.

Operation then proceeds to block 315 in which it is queried whether MBT is greater than the minSAD value. Each of multiple SAD values is determined according to the following equation (5):

$$SAD = \sum_{i=1}^{16}\sum_{j=1}^{16}|R_{i,j}| = \sum_{i=1}^{16}\sum_{j=1}^{16}|CB_{i,j} - RB_{i,j}| \quad (5)$$

in which CB references the current macroblock of the current frame being processed, RB references a reference search macroblock from a reference frame, and R is a residual value for each 16×16 macroblock. Thus, the absolute values of the differences between each pixel value $CB_{i,j}$ of the current macroblock of the current frame and the corresponding pixel value $R_{i,j}$ of the reference frame are added together to determine the corresponding SAD value. This calculation is repeated for each reference search macroblock in the search window (according to the selected motion search pattern) and the least SAD value is determined as minSAD. If minSAD is less than MBT as determined at block 315, then operation proceeds to block 317 in which computation complexity is reduced by adjusting the PEA signal to indicate that sub-pixel interpolation is to be skipped altogether so that only the integer motion vector MV is used. In this manner, prediction error reduction computations of the video encoder 101 are reduced. If MBT is not greater than minSAD as determined at block 315, operation proceeds instead to block 319 to query whether minSAD is less than or equal to RBT. If so, operation proceeds to block 317 in which prediction error reduction computations of the video encoder 101 are reduced by adjusting the PEA signal to indicate that sub-pixel interpolation is to be skipped altogether. Otherwise, if minSAD is not less than or equal to RBT as determined at block 319, operation proceeds instead to block 321 in which the PEA signal is adjusted to enable sub-pixel interpolation. For blocks 207, 211, 219 and 229 of FIG. 2 when sub-pixel interpolation is enabled and PSF is less than or equal to eight (8), then the PEA signal is adjusted at block 321 to indicate that sub-pixel interpolation is to be performed down to the ¼ pixel level. If, however, PSF is greater than eight (8) as is the case for block 239, then the PEA signal is adjusted to indicate that sub-pixel interpolation is to be performed only to the ½ pixel level and ¼ pixel interpolation is skipped. Operation returns to block 301 to continuously monitor changes in the values of QP, PSF and BF, update the MBT and RBT, compare each with minSAD and determine the appropriate level of pixel interpolation.

The coding controller 105 performs fast mode decisions when PSF is two (2) or more as described for blocks 213, 221, 231 and 245. For fast mode decision, a mean pixel value $\mu_{CB}$ of the current macroblock is determined according to the following equation (6):

$$\mu_{CB} = \frac{1}{256}\sum_{i=1}^{16}\sum_{j=1}^{16} CB_{i,j} \quad (6)$$

in which all of the 256 pixel values for the current macroblock are added together and then divided by 256 to determine the mean pixel value $\mu_{CB}$ of the current macroblock. And then a SAD value of the current macroblock relative to its mean, represented as SADM, is determined according to the following equation (7):

$$SADM = \sum_{i=1}^{16}\sum_{j=1}^{16}|CB_{i,j} - \mu_{CB}| \quad (7)$$

The intracoding mode is chosen if minSAD is greater than or equal to TH as determined at block 241 when PSF≥8, or otherwise intercoding mode is chosen when SADM<minSAD−500 when PSF>1. The normal mode decision determination is made whenever PSF<2.

Figure 4:
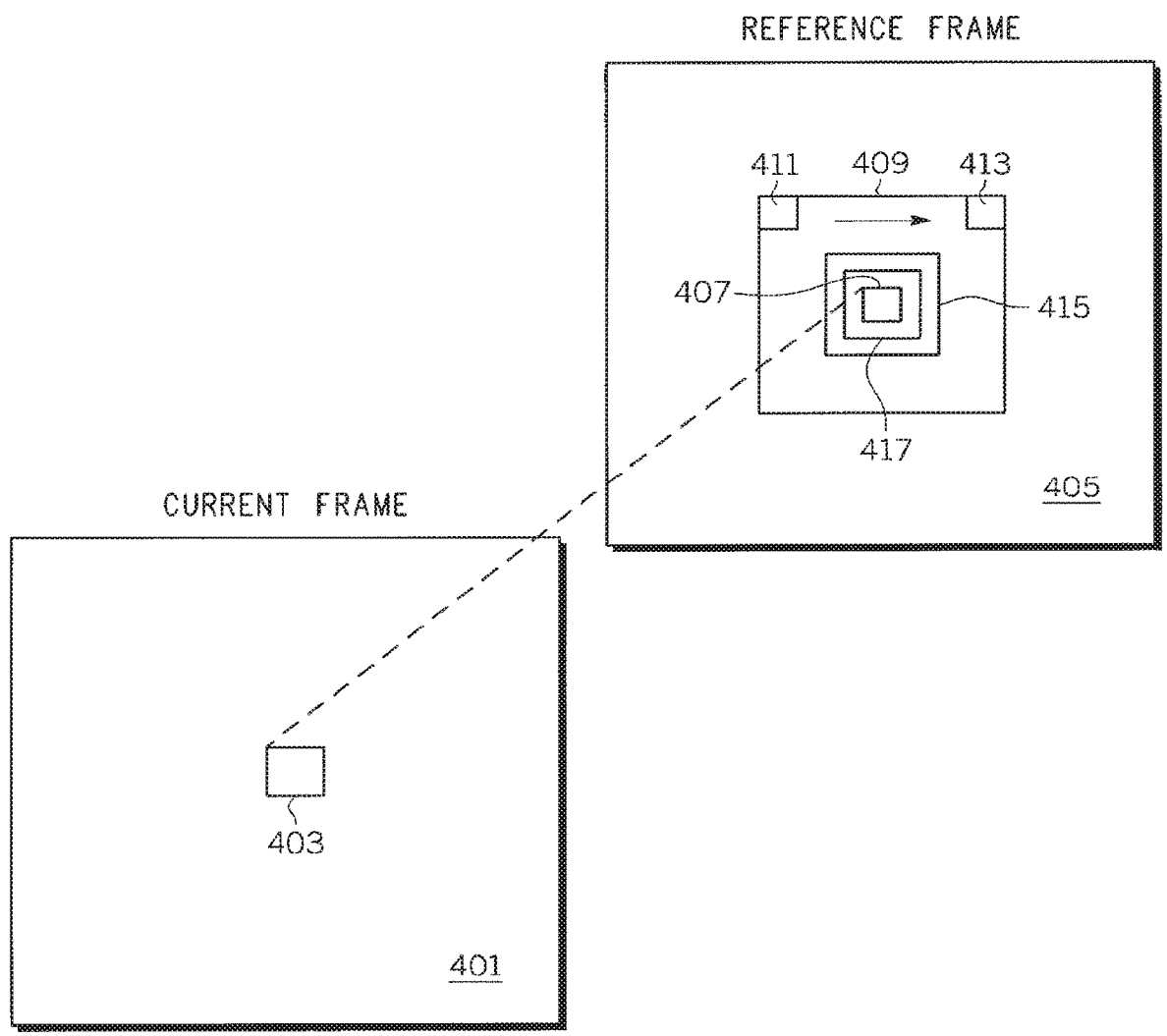
FIG. 4 is a simplified block diagram illustrating modification of the motion search method (MSM) according to an exemplary embodiment in which the search window is reduced based on PSF.

FIG. 4 is a simplified block diagram illustrating modification of the motion search method (MSM) according to an exemplary embodiment in which the search window is reduced based on PSF. For each macroblock in a current frame 401, motion estimation searches a predetermined block-matching search area of a reference frame 405 for a macroblock that best matches the current macroblock in the current frame 401. Motion estimation uses an error measure to identify the best matching macroblock. Although the entire reference frame 405 may be searched, the search is typically confined to smaller area within the reference frame 405 that represents the anticipated motion range of an object between the reference frame 405 and the current frame 401. In this case, the current frame 401 is shown with a current macroblock 403, and the reference frame 405 is shown with an initial reference macroblock 407 having the same relative position within the reference frame 405. A full search window 409 is typically defined relative to the initial reference macroblock 407 within the reference frame 405 rather than the entire reference frame 405. In one exemplary full search mode, a first search macroblock 411 located at the upper-leftmost of the full search window 409 is examined first, followed by a second search macroblock one horizontal pixel position to the right of the first search macroblock 411, and so on for the entire top row of macroblocks to a last search macroblock 413 located at the upper-rightmost position of the full search window 409. The procedure is repeated by dropping down a single pixel in the vertical direction relative to the first search macroblock 411 to define a second row of search macroblocks from left to right, and so on down to the bottom of the full search window 409.

For each search macroblock in the full search window 409, motion estimation determines an error measure and a motion vector MV to represent the translation between the current block and that search macroblock. The error measures of all of the search macroblocks are compared to identify the best matching macroblock. The error measure of the best matching block becomes a prediction error that represents the difference between the current block and the best matching block. The motion vector MV and the prediction error are efficiently coded at a far lower bit rate than individually coding each successive video frame in a sequence of video frames. Thus, interframe redundancy is removed and data compression is achieved. The decoder 104 reconstructs each frame from the motion vector, prediction error, and reference frames. In an exemplary embodiment, a SAD value is calculated in accordance with equation (5) previously described as the error measure for each search macroblock. The lowest SAD value, or the minSAD value, is selected as the error measure and the corresponding search macroblock becomes the best matching macroblock for the current macroblock 403. The motion vector MV is determined between the current macroblock 403 and the best selected matching macroblock within the selected search window.

In one embodiment, the full search window 409 is generally determined by moving to the left and right in the vertical direction within a range of "M" pixels relative to the upper-left pixel of the reference macroblock 407 and moving up and down in the horizontal direction within the same range of M pixels relative to the upper-left pixel of the reference macroblock 407 to define a full search window size of 2M×2M pixels. The full search window size of 2M×2M pixels includes up to 2M×2M potential searching candidates candidate macroblocks) for motion estimation. If M=16, then the full search window is 32×32 search macroblocks for a total of 1,024 search macroblocks it is appreciated by those of ordinary skill in the art that this relatively large search window consumes a significant amount of processing power if all of the candidate macroblocks are searched according to a full search motion estimation algorithm. In one embodiment, the search window is reduced as shown by reduced search window 415, such as reducing M to ½M. Reducing M to half its original value effectively reduces the motion search window by one-fourth the search size and thus one-fourth the number of search macroblocks. In particular, if ½ is 8 then the new search window is 16×16=256 search macroblocks, which is one-fourth the size of the full search range window of 1,024 search macroblocks. In the illustrated embodiment, the reduced search window 415 is used as MSM1 at block 219 when PSF is greater than two (2) thereby significantly reducing computation complexity by reducing the search window. Reducing the search window size again when PSF is greater than or equal to 5, such as shown at 417, further reduces computation complexity as previously described at block 229. Further search window size reductions are possible and contemplated, such as described at block 239 when PSF>8. And in addition or in the alternative to the reduction of the search window, the search pattern is modified as previously described, such as according to any suitable fast motion search method. Thus, for any size of selected search window, the fast motion search method searches less than the total number of candidate macroblocks within the selected search window.

A method of scaling complexity of a video processing system according to an embodiment of the present invention includes determining a power saving factor based on at least one operating parameter of the video processing system and adjusting processing of video information based on the power saving factor to reduce computation complexity. The at least one operating parameter includes available power of the video processing system.

The method of complexity scalability may include determining the power saving factor based on available power and available processing capacity. The method may include successively reducing processing complexity of multiple prioritized coding methods from a lowest priority to a highest priority with successively increasing level of the power saving factor. The method may include prioritizing the coding methods based on coding efficiency and computation cost.

The method of scaling complexity may include reducing an amount of sub-pixel interpolation in response to an increase of the power saving factor. The method may include performing fast mode decision between intracoding and intercoding modes when the power saving factor is greater than a minimum level. The method may include forcing the intracoding mode when the power saving factor reaches a predetermined level and when a motion error metric is at least a predetermined threshold.

The method of scaling complexity may include successively reducing processing of intra prediction for intracoding mode with successive increases of the power saving factor. The method may include successively reducing motion search processing with successive increases of the power saving factor. Reducing motion search processing may include sequentially reducing a motion search window with successive increases of the power saving factor.

A method of complexity scalability for a video processing system using prioritized layered coding according to another embodiment of the present invention includes determining a power saving factor based on power capacity of the video processing system and reducing processing complexity of a plurality of prioritized coding functions in a predetermined order of priority based on the level of the power saving factor. The reducing processing complexity may be implemented in any of a variety of ways, such as performing prediction error adjustment when the power saving factor is at least a first level, performing fast mode decision when the power saving factor is at least a second level which is greater than the first level, and reducing motion search processing when the power saving factor is at least a third level which is greater than the second level.

The method of complexity scalability may further include reducing intra prediction processing when the power saving factor is at least the second level. The method of complexity scalability may further include successively reducing intra prediction processing with successive increases of the power saving factor above the second level. The method of complexity scalability may further include successively reducing motion processing with successive increases of the power saving factor above the third level. The method of complexity scalability may further include forcing intracoding mode when the power saving factor is greater than a fourth level which is greater than the third level and when a motion error metric is at least a predetermined threshold. The method of complexity scalability may further include disabling deblock filtering when the power saving factor is greater than a fourth level which is greater than the third level.

A video processing system according to an embodiment of the present invention includes a power management circuit which monitors at least one operating parameter and provides a power saving factor indicative thereof, and a video encoder system which adjusts computation complexity while encoding video information based on the power saving factor. The at least one operating parameter includes available power. The at least one operating parameter may also include available processing capacity among other power metrics such as channel strength, user settings, etc.

The video processing system may further include a prediction error adjustment circuit which provides a prediction error adjustment signal based on the power saving factor. In this case, the video encoder system may include an intercoding circuit which adjusts an amount of sub-pixel interpolation based on the prediction error adjustment signal. The intercoding circuit reduces the amount of sub-pixel interpolation with an increase of the power saving factor.

The video encoder system of the video processing system may include a coding controller which performs fast coding mode decision between intracoding and intercoding modes when the power saving factor reaches a predetermined level.

The coding controller may be configured to force the intracoding mode when the power reaches a predetermined level and when a motion error metric is at least a predetermined threshold.

The video encoder system video of the video processing system may include an intra prediction circuit which successively reduces intra prediction for intracoding mode with successive increases of the power saving factor.

The video encoder system video of the video processing system may include a motion estimation circuit which successively reduces motion search processing with successive increases of the power saving factor above a predetermined level.

Although the present invention has been described in considerable detail with reference to certain preferred versions thereof, other versions and variations are possible and contemplated. For example, circuits or logic blocks described herein may be implemented as discrete circuitry or integrated circuitry or software or any alternative configurations. The video processing system 100 of FIG. 1 may be implemented entirely in software, which may be suitable for certain smaller video or mobile applications. For larger or more sophisticated video applications, the video encoder 101 is implemented in hardware. The entire system 100 may also be implemented completely in hardware. In one embodiment, the video encoder 101 is implemented in hardware, the power management circuit 109 and the prediction error adjustment circuit 107 are implemented in software, and the coding controller 105 is implemented in either hardware or software depending upon the particular configuration.

The particular priorities of the coding functions may be rearranged depending upon the particular configuration and/or desired processing complexity reduction that is necessary or desired. For example, the relative priorities of prediction error adjustment, fast mode decision, intra prediction processing, and motion search processing may be rearranged. And further, the particular processing complexity reductions may be varied in any different manner according to needs of specific configurations of video codecs. For example, the particular reductions of the search window for motion search processing may be varied in any suitable manner, and/or alternative motion search algorithms may be employed based on the level of PSF. As shown in the flowchart diagram of FIG. 2, prediction error adjustment is selected first (as soon as PSF rises above zero) as the highest priority for removing because it has not only low coding efficiency, but also the processing complexity can be reduced in both the encoder and the decoder. The motion search processing, on the other hand, reduces processing complexity only at the encoder since motion estimation search is not performed at the decoder.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. A method of processing video information comprising:
processing video information by a video processing system based on a power saving factor, the processing video information includes processing video information at a frame size, frame rate, and a frame type;
determining a change in the power saving factor and adjusting the processing video information by the video processing system in response to the change, wherein the adjusting includes changing the computation complexity of the processing video information while maintaining the frame size, the frame rate and the frame type, wherein the adjusting the processing video information comprises:
performing prediction error adjustment to adjust an amount of sub-pixel interpolation.

2. The method of claim 1, wherein the performing prediction error adjustment comprises reducing an amount of sub-pixel interpolation in response to the change of the power saving factor indicating a less computation complexity.

3. The method of claim 1 wherein the power saving factor is determined based on at least one operating parameter of the video processing system.

4. The method of claim 1 wherein the power saving factor is determined by a setting.

5. The method of claim 1 wherein the changing the computation complexity of the processing video information comprises reducing an amount of sub-pixel interpolation.

6. The method of claim 5 wherein the reducing an amount of sub-pixel interpolation includes not performing sub-pixel interpolation.

7. The method of claim 5 wherein the reducing an amount of sub-pixel interpolation includes reducing a level of sub-pixel interpolation.

8. The method of claim 1 wherein the processing video information includes performing ¼pixel interpolation, wherein the adjusting the processing video information by the video processing system in response to the change includes not performing ¼pixel interpolation.

9. The method of claim 1 wherein the processing of video information includes performing ½pixel interpolation, wherein the adjusting the processing of video information by the video processing system in response to the change includes not performing ½pixel interpolation.

10. The method of claim 1, wherein the adjusting the processing video information by the video processing system further comprises limiting processing of intra prediction for an intracoding mode.

11. The method of claim 1, wherein the adjusting the processing video information by the video processing system further comprises adjusting motion search processing.

12. The method of claim 1, wherein the adjusting the processing video information by the video processing system further comprises forcing intracoding mode for at least one video block.

13. The method of claim 1 wherein the adjusting the processing video information by the video processing system further comprises performing fast mode decision to reduce processing performed for selecting between an intracoding mode and an intercoding mode for each video block of a frame.

14. The method of claim 11, wherein the performing prediction error adjustment comprises reducing an amount of sub-pixel interpolation in response to the change of the power saving factor indicating a less computation complexity.

15. The method of claim 11 wherein the power saving factor is determined based on at least one operating parameter of the video processing system.

16. The method of claim 11 wherein the power saving factor is determined by a setting.

17. The method of claim 11 wherein the changing adjusting the computation complexity of the processing video information comprises reducing an amount of sub-pixel interpolation.

18. The method of claim 17 wherein the reducing an amount of sub-pixel interpolation includes not performing sub-pixel interpolation.

19. The method of claim 17 wherein the reducing an amount of sub-pixel interpolation includes reducing a level of sub-pixel interpolation.

20. The method of claim 11 wherein the processing video information includes performing ¼pixel interpolation, wherein the adjusting the processing video information by the video processing system in response to the change includes not performing ¼pixel interpolation.

21. The method of claim 11 wherein the processing of video information includes performing ½pixel interpolation, wherein the adjusting the processing of video information by the video processing system in response to the change includes not performing ½pixel interpolation.

22. The method of claim 11, wherein the adjusting the processing video information by the video processing system further comprises limiting processing of intra prediction for an intracoding mode.

23. The method of claim 11, wherein the adjusting the processing video information by the video processing system further comprises forcing intracoding mode for at least one video block.

24. The method of claim 11 wherein the adjusting the processing video information by the video processing system further comprises performing fast mode decision to reduce processing performed for selecting between an intracoding mode and an intercoding mode for each video block of a frame.

* * * * *